C. SCHNEPF.
Corn Planter.
No. 17,898.
Patented July 28, 1857.
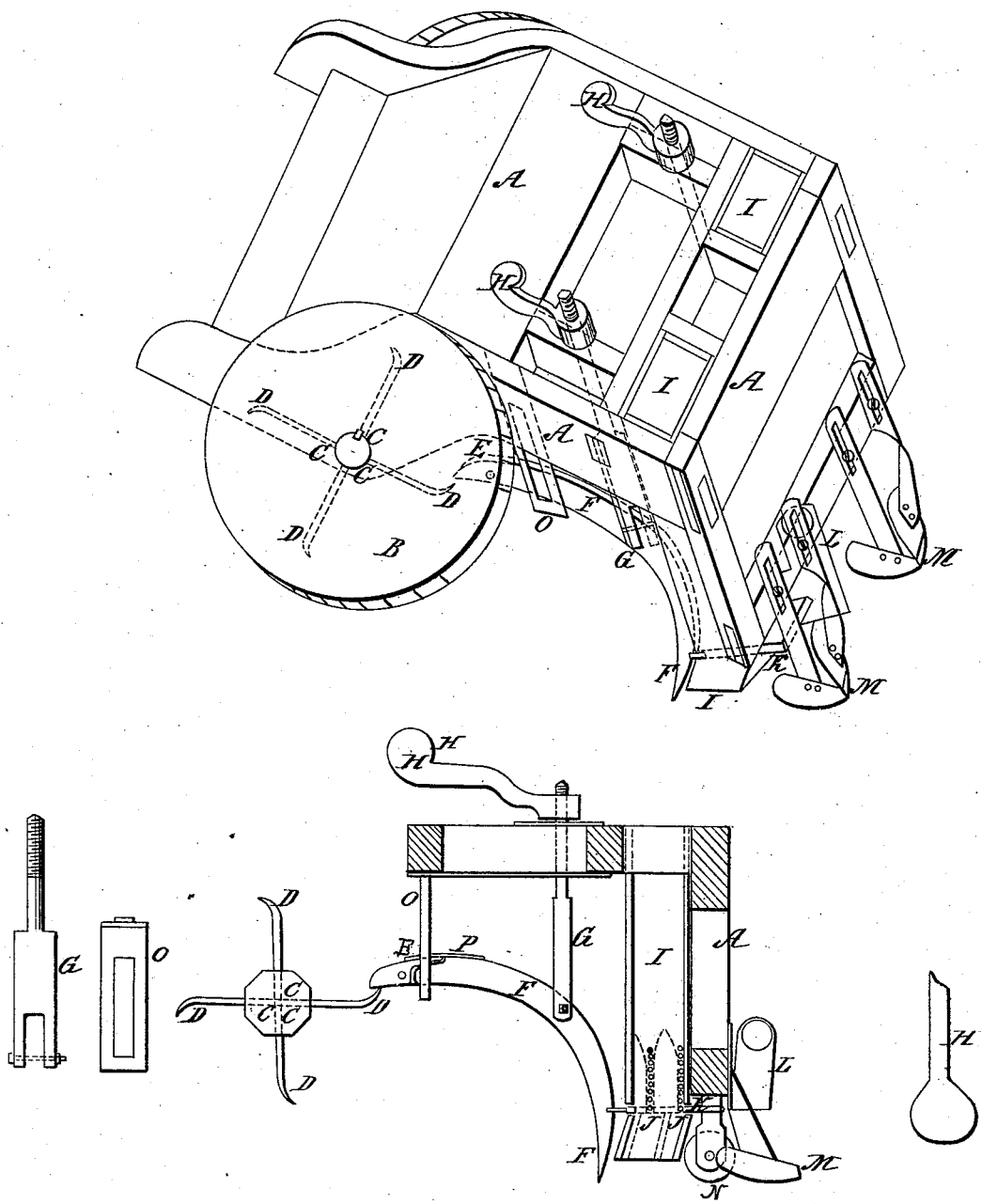

UNITED STATES PATENT OFFICE.

CHARLES SCHNEPF, OF LANCASTER, PENNSYLVANIA.

IMPROVEMENT IN CORN-PLANTERS.

Specification forming part of Letters Patent No. 17,898, dated July 28, 1857.

*To all whom it may concern:*

Be it known that I, CHARLES SCHNEPF, of the city of Lancaster and State of Pennsylvania, have invented new and useful Improvements in Machines for Planting Corn; and I do hereby declare that the following is a full and exact description thereof, reference being had to the accompanying drawings, and to the letters of reference marked thereon.

The nature of my invention is a semicircular hoe with jointed ends for scooping out the earth and planting corn at regular distances.

To enable others skilled in the art to make and use my invention, I will proceed to describe its construction and operation.

A is the frame of the machine, with a driver's seat at top.

B are the carriage-wheels, about four feet in diameter.

C are four cross levers or arms, (attached to and projecting from the carriage-wheel axle between the carriage-wheels B and under the driver's seat or frame A,) with their points D curved upward, so that by the revolution of the carriage-wheel these levers C raise the end E of the hoe F. This iron hoe F is of a semicircular shape, with its lower end, F, flattened and shaped similar to the ordinary hoes, and is attached to the machine at its center by a lug, G, which extends above the frame-work A, and is for the purpose of raising or lowering the hoe F to regulate the depth of hole in the ground by turning the lever H at top, which lever operates as a screw upon the lug G.

The hopper I, which holds the corn, is a long square vertical box, having double bottoms, with four apertures, J, one in each corner of the hopper, and between the bottoms is a slider, K, which has likewise four round apertures of a size to allow four grains of corn to fall, one through each aperture, at one time. The front part of the slider K is attached by a link or hook to the hoe F, and the back end of the slider K is operated on by a spiral spring, L, attached to back part of hopper I. Immediately back of the hopper I is a triangular-shaped shovel, M, attached to the back end of frame A, with the point of its shovel projecting back. A small wheel, N, is likewise attached to the hind part of frame A, to keep the machine perfectly level with the carriage-wheels, and to allow the planter to operate when crossing a gutter or hillock as well as on level ground.

As the carriage-wheels revolve the levers C, on the carriage-axles, are brought in contact with the end E of the semicircular hoe F, and the end E, which causes the hoe F to dip and raise scoop out a hole in the ground every three feet distant at more regular distances than can be done by hand. These hoes do not drag on the ground or make a furrow like the ordinary plow, but they operate as a hoe, and, being attached to the slider K, a grain of corn is dropped into each of the four holes made by the hoe, while the spiral spring L causes the slider K and hoe F to fly back until the next lever C again causes the hoe to dip and make another hole for the grain to fall in, when the shovel M draws the earth over and covers up the grain.

There are two hoes, F, on this machine, and each hoe acts alternately at intermediate distances, making a hole for the corn three feet apart and at right angles from each other with perfect regularity, and by which ten or twelve acres of corn can be easily planted in one day, requiring only the labor of one man to act as a driver to guide the horses and keep the vertical hopper I filled with corn.

O are posts suspended from the frame A, with slots in which the ends E operate, and are used as guide-posts to prevent the ends E from having a lateral motion.

The ends E of the hoes F are jointed to the semicircular hoe F, and have a horizontal spring, P, on the top edge of the joint for the purpose of yielding to the pressure of the levers C when the machine is being turned around or backward to prevent the machine from being put out of gear.

I am aware that shovels and teeth are attached to sliders for planting corn; but these I do not claim.

What I claim as my invention, and desire to secure by Letters Patent, is—

The semicircular-shaped scooping-hoes F, with jointed ends E, in combination with the sliders K, and operated by the revolving levers C, as arranged and constructed, substantially as herein described, for the purposes herein set forth.

CHARLES SCHNEPF.

Witnesses:
M. CARPENTER,
J. FRANKLIN REIGART.